G. HEGER.
COMBINED SLED AND TRUCK.
APPLICATION FILED MAR. 19, 1919.
1,331,501. Patented Feb. 24, 1920.
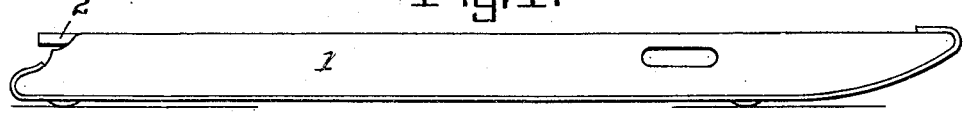
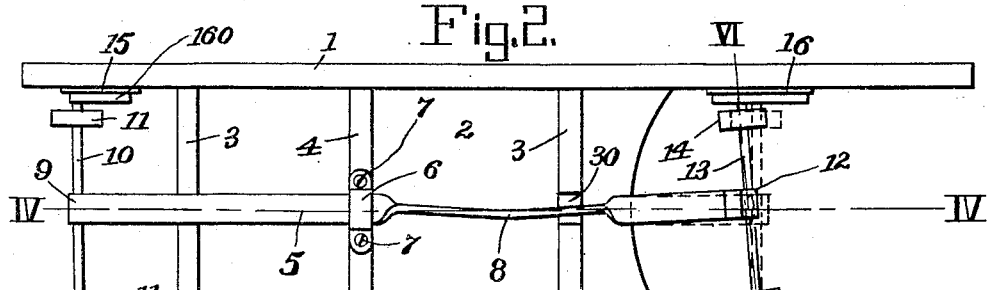
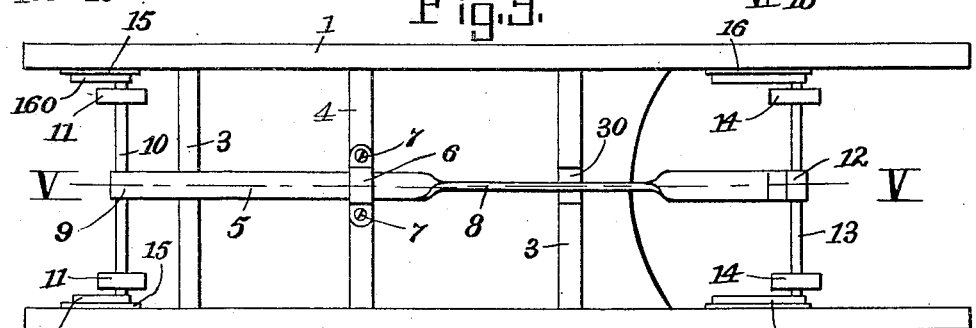
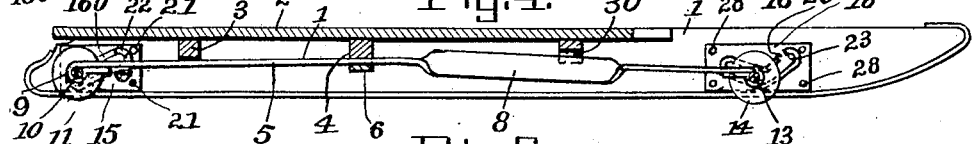
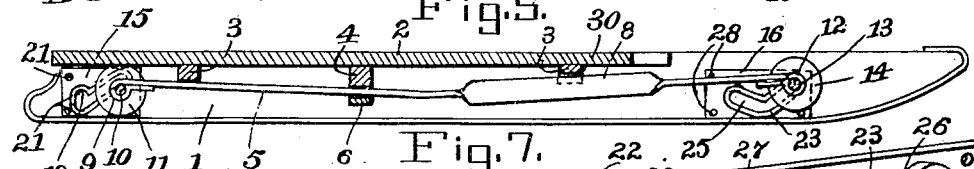
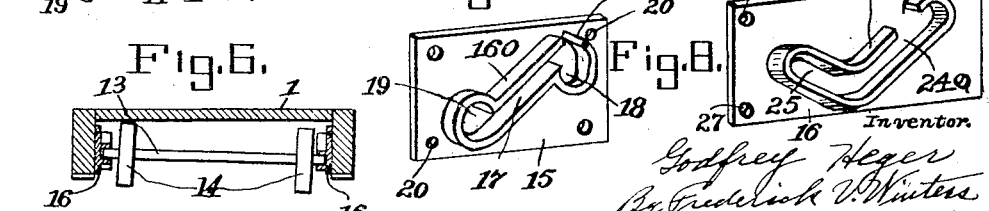
Inventor
Godfrey Heger
By Frederick V. Winters
Attorney.

# UNITED STATES PATENT OFFICE.

GODFREY HEGER, OF NEW YORK, N. Y.

COMBINED SLED AND TRUCK.

1,331,501.  Specification of Letters Patent.  Patented Feb. 24, 1920.

Application filed March 19, 1919. Serial No. 283,485.

*To all whom it may concern:*

Be it known that I, GODFREY HEGER, a citizen of the United States, residing at New York, in the county and State of New York, have invented certain new and useful Improvements in Combined Sleds and Trucks, of which the following is a full, clear, and exact specification.

This invention relates to combined sleds and trucks, and has for its object to provide improved means whereby a set of truck wheels may be applied to a sled with little or no alterations.

A special object is to provide improved means for retaining the wheels in either projected or retracted position with respect to the edges of the runners. Another object is to provide improved means for guiding or steering the sled when used as a truck. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a side view of a sled with the wheels projected so that it may be used as a truck.

Fig. 2 is an under plan view of the sled, showing the front axle deflected, as in steering, in solid lines, and in normal position in dotted lines.

Fig. 3 is an under plan view showing the wheels in retracted position.

Fig. 4 is a section on the line IV—IV of Fig. 2.

Fig. 5 is a similar view on line V—V of Fig. 3.

Fig. 6 is a section on line VI—VI of Fig. 2.

Fig. 7 is a detailed perspective view of one of the rear axle guiding plates, and Fig. 8 is a similar view of one of the front axle guiding plates.

The runners of an ordinary sled are indicated at 1 and the top of the sled at 2, while the usual cross pieces are shown at 3. In applying the wheels to the sled, an additional cross piece 4 is placed between the two pieces 3 and suitably secured to the top or runners of the sled. To said cross piece 4 there is secured a loop 6 by means of screws 7, and through said loop is passed a spring bar 5 having a portion in front of the cross piece 4 twisted from horizontal to vertical position, as at 8, for a purpose hereinafter explained. The bar 5 is connected at the ends to rear and front axles 10 and 13, respectively, by loops 9 and 12. The rear axle 10 carries wheels 11 which may be mounted on ball bearings if desired, and the front axle 13 carries similar wheels 14.

The ends of the rear axle engage grooves 17 in plates 15 which are attached to the inner faces of the runners by screws 21 passed through holes 20 in said plates. As shown in the drawings, the grooves in the plates 15 are formed between inwardly extending flanges 160 in each of which an opening 22 is left for the introduction of the ends of the rear axle. The groove 17 is inclined and terminates at opposite ends in pockets 18 and 19. When the ends of the rear axle are arranged in the pockets 19, as shown in Fig. 4, the wheels are projected from the edges of the runners. When the ends of said axle are in the pockets 18, as shown in Fig. 5, the wheels are retracted.

The ends of the front axle engage grooves 24 formed between inwardly extending flanges 23 on plates 16 which are attached to the inner faces of the runners by screws 28 passed through holes 27 in the plates. An opening 26 may be provided in the flange 23 of each of the grooves 24 for permitting the ends of the axle to be introduced into the grooves. The main portions 24 of said grooves are arranged substantially parallel to the grooves 17 of the rear plates 15, and inasmuch as the two axles are connected by the spring bar 5, when the rear axle has its ends arranged in the pockets 19, the ends of the front axle will be engaged with the lower end portions of the grooves in the plates 16, while when the ends of the rear axle are engaged with the pockets 18, the front axle will have its ends arranged in the upper end portions of the grooves 24. The axles may be moved from one position to the other by grasping the bar 5 and disengaging the rear axle from one pocket and moving it along the groove to the other pocket of the grooves 17, the front axle being adjusted at the same time as just explained.

At the upper end of each of the grooves 24 in the front plates there is an extension groove 25 extending at an angle to the groove 24 and toward the edge of the runner. When the wheels are projected, the ends of the front axle are arranged in the entrance to said extension grooves, and by deflecting said front axle, as by exerting more pressure on one side of the front portion of the sled than on the other, the corresponding end of the front axle may be caused to move rearwardly and upwardly along said extension groove 25 thereby turning or deflecting the axle, as indicated in Figs. 2 and 6 for steering or guiding the sled. The twisted portion 8 of the spring bar facilitates this movement of the front axle and returns the same to normal position when the extra pressure is taken off one side of the sled. A notch 30 may be formed in the cross piece 3 for the part 8.

Having thus described my invention, what I claim as new and desire to secure by Letters Patent of the United States is:—

1. The combination with a sled, including the runners thereof, of plates secured to the inner faces of the runners and having inclined grooves in their inner surfaces, axles having their ends arranged in said grooves, means at opposite ends of certain of the grooves for retaining the ends of the axles in different positions with respect to the edges of the runners, wheels on said axles to be projected or retracted from said edges of the runners, and a spring bar connecting the axles and connected at an intermediate point to the sled for holding the ends of the axles at different points in the grooves.

2. The combination with a sled, including the runners thereof, of plates secured to the inner faces of the runners near each end of the sled, the plates at one end having inclined grooves terminating with end pockets, and the other plates having angular grooves comprising branches substantially parallel to the grooves in the first mentioned plates and other branches inclined toward the top of the sled, axles having their ends engaged with the grooves in the respective plates, wheels on said axles to be projected or retracted from the edges of the runners by moving the axles along the grooves in said plates, resilient means for retaining one axle with its ends in the pockets at either end of the grooves in their plates while the ends of the other axle are arranged in the angular extensions of the grooves in their plates, and resilient means for permitting one end of the last mentioned axle to travel along said extension of the groove in its plate for guiding the sled.

3. The combination with a sled, including the runners thereof, of plates secured to the inner faces of the runners, one pair of said plates being arranged near the rear ends of said runners and another pair near the front ends of said runners, the rear pair of plates having inclined grooves terminating in pockets at their opposite ends, a rear axle having its ends engaging said grooves, the front plates having inclined grooves arranged substantially parallel to the grooves in the rear plates, the grooves in said front plates also having angular extensions extending toward the top of the sled, a front axle having its ends arranged in said grooves of the front plates, wheels on said axles to be projected or retracted from the edges of the runners when the rear axle is arranged in one or the other of the pockets at the ends of their grooves in the rear pair of plates, a spring bar connecting said axles, a loop attached to the sled and through which the intermediate portion of said bar is passed to create tension therein for retaining the rear axle in either of the pockets in the grooves in the rear plates, said bar being capable of yielding laterally to permit one end of the front axle to be advanced farther along the extension of the groove in its front plate than the other end of said front axle to guide the sled.

4. The combination with a sled, including the runners thereof, of axles arranged transversely of the sled between the runners, means on the runners to guide said axles toward and away from the edges of the runners, wheels on said axles to be projected or retracted from the edges of the runners by movement of the axles, and a spring bar connecting the axles together and adapted to be placed under tension when they are in either projected or retracted position for retaining them in such positions.

5. The combination with a sled, including the runners thereof, of axles arranged transversely of the sled between the runners, means on the runners to guide said axles toward or away from the edges of the runners, wheels on the axles to be projected or retracted from the edges of the runners by the movement of the axles, and a spring bar connected to the front axle and adapted to yield laterally to permit one end of said front axle to be advanced ahead of the other end for guiding the sled.

6. The combination with a sled, including the runners thereof, of axles arranged transversely of the sled between the runners, means on the runners to guide said axles toward or away from the edges of the runners, wheels on the axles to be projected or retracted from the edges of the runners by the movement of the axles, and a spring bar connecting the axles together and adapted to be placed under tension when they are in either projected or retracted position for retaining them in such positions, said bar having a twisted portion permitting it to yield laterally to allow one end of the front axle to be advanced ahead of the other end for guiding the sled.

In testimony whereof I have signed my name to this specification.

GODFREY HEGER.